US011900798B2

(12) United States Patent
Horn

(10) Patent No.: US 11,900,798 B2
(45) Date of Patent: Feb. 13, 2024

(54) SYSTEM AND METHODS FOR MOBILE SURVEILLANCE

(71) Applicant: VIG VEHICLE INTELLIGENCE GROUP LLC, Carefree, AZ (US)

(72) Inventor: Greg Horn, Burr Ridge, IL (US)

(73) Assignee: VIG Vehicle Intelligence Group LLC, Carefree, AZ (US)

( * ) Notice: Subject to any disclaimer, the term of this patent is extended or adjusted under 35 U.S.C. 154(b) by 0 days.

(21) Appl. No.: 17/154,042

(22) Filed: Jan. 21, 2021

(65) Prior Publication Data

US 2021/0225161 A1 Jul. 22, 2021

Related U.S. Application Data

(60) Provisional application No. 62/964,247, filed on Jan. 22, 2020.

(51) Int. Cl.
*G08G 1/00* (2006.01)
*G08G 1/01* (2006.01)

(52) U.S. Cl.
CPC .................................. *G08G 1/0133* (2013.01)

(58) Field of Classification Search
CPC .... G08G 1/0133; G06K 9/00335; G06K 9/00; G06K 9/00604; G06K 9/00771; G06K 9/00791; G06K 9/00845; G06K 9/00979; B60K 35/00; B60K 37/00; B60K 37/02; B60K 37/06; B60R 16/037; B60R 21/01512; B60R 7/04; B60W 30/182; B60W 40/04; B60W 40/08; B60W 40/09;
(Continued)

(56) References Cited

U.S. PATENT DOCUMENTS 8,452,502 B2 * 5/2013 Katayama ............ G07C 5/0858
340/436
2008/0285797 A1 * 11/2008 Hammadou ........... G06V 20/52
382/103

(Continued)

FOREIGN PATENT DOCUMENTS

CN 217320247 U * 8/2022
JP 2021026687 A * 2/2021
WO WO-2016119647 A1 * 8/2016

OTHER PUBLICATIONS

ELSAG Mobile Plate Hunter ALPR System. Leonardo Company. 2 pages.

*Primary Examiner* — Brian A Zimmerman
*Assistant Examiner* — Anthony D Afrifa-Kyei
(74) *Attorney, Agent, or Firm* — Lathrop GPM LLP; Richard Beem; Alex Shtraym

(57) ABSTRACT

The invention relates to mobile surveillance and, more particularly, to systems and methods for policing traffic violations, such as illegal cell phone use while driving. The surveillance system may include a mobile unit and an imaging device configured to monitor, detect, and record vehicles moving in the same direction or in an opposite direction of the mobile unit. The imaging device may capture license plate information and other data, such as characteristics corresponding to the driver of the vehicle. Advantageously, the surveillance system can record, analyze, detect, and communicate distracted driver violations effectively and efficiently.

20 Claims, 9 Drawing Sheets

(58) Field of Classification Search
CPC .. B60W 50/0098; B60W 50/08; G06N 3/084; G06N 3/0481; G06N 5/02; G06N 7/005
See application file for complete search history.

(56) References Cited

U.S. PATENT DOCUMENTS

| | | | | |
|---|---|---|---|---|
| 2013/0116856 | A1* | 5/2013 | Schadeck | B60K 28/06 701/1 |
| 2014/0210646 | A1* | 7/2014 | Subramanya | B61L 29/28 348/148 |
| 2014/0347440 | A1* | 11/2014 | Hatcher | H04N 23/58 348/36 |
| 2015/0112730 | A1* | 4/2015 | Binion | G07C 5/008 705/4 |
| 2016/0012394 | A1* | 1/2016 | Reed | G06Q 10/08355 705/26.81 |
| 2016/0358477 | A1* | 12/2016 | Ansari | G06Q 40/08 |
| 2018/0211117 | A1* | 7/2018 | Ratti | G06V 10/764 |
| 2019/0375357 | A1* | 12/2019 | Mezaael | B60R 11/04 |

* cited by examiner

400

500

700

SYSTEM AND METHODS FOR MOBILE SURVEILLANCE

CROSS-REFERENCE TO RELATED APPLICATIONS

This application claims benefit of U.S. Application No. 62/964,247 filed on Jan. 22, 2020, which is incorporated by reference in its entirety.

FIELD OF THE INVENTION

The invention relates generally to the field of mobile surveillance. More particularly, the invention relates to a system and methods for detecting traffic violations, such as illegal cell phone use while driving, through the analysis of data obtained by an imaging device of a mobile unit.

BACKGROUND

Traffic violations occur when drivers violate laws that regulate vehicle operation on streets and highways. One example of a traffic violation includes running a red light.

To combat red light running, recording systems have been installed at certain intersections to detect and capture such violations. These conventional systems may connect to a traffic signal controller for detecting when a vehicle has improperly entered the intersection. Traditionally, such systems develop video evidence, which can then be processed by police, government, or private contractor personnel, to produce citations which are mailed to the vehicle's owner based on the associated license plate and vehicle images.

However, the use of conventional recording systems is often limited to detecting moving violations with respect to a vehicle. This is often because such systems are static, i.e., they are at a fixed location. As a result, such systems are often unable to detect violations relating to the driver, especially those that occur outside a fixed location. Examples of violations relating to the driver may include activities that could potentially distract a driver from the primary task of operating a vehicle, such as driving while texting.

Also, many conventional systems for detecting moving violations are associated with high manufacturing and maintenance cost. This is often due to the amount of resources required, such as expensive camera equipment, sensors, and communication lines. Other factors that may increase the cost include the distance from the system to the vehicle, security concerns, and weather conditions.

Additionally, conventional systems often rely on flash illumination to capture vehicle information in dark conditions. Such illumination can distract the driver, especially at night. This may further impair the driver's focus and attentiveness.

Therefore, there is a need for a system and methods that facilitate recording, analyzing, detecting, and communicating distracted driver violations effectively and efficiently. The present invention satisfies this demand.

SUMMARY

The invention relates generally to mobile surveillance and, more particularly, to a surveillance system and methods by which an imaging device of a mobile unit is configured to monitor and record traffic violations. Advantageously, through use of the mobile unit, the system can analyze, detect, and communicate distracted driver violations effectively and efficiently.

An aspect of the present disclosure is a surveillance system for policing traffic violations. The surveillance system may include one more imaging devices mounted on a mobile unit. The one or more imaging devices may be configured to record driver characteristics and vehicle information corresponding to another vehicle.

The one or more imaging devices may be a camera, a license plate reader or a combination of both. The imaging devices may be configured to continuously monitor surroundings and/or wake from a low power state in response to detecting the vehicle.

The surveillance system may further include data processing logic that is operatively coupled to a memory and the one or more imaging devices. In operation, the data processing logic may be operative to access the recorded driver characteristics and the vehicle information. The vehicle information may be processed to extract characteristics of the vehicle, such as license plate information.

In addition, the data processing logic may be configured to analyze the driver characteristics to detect one or more objects corresponding to an occupant of the vehicle. In response to detecting the one or more objects, the data processing logic may preserve the recorded driver characteristics and vehicle information for generating an evidentiary record, which may be utilized in policing traffic violations. Furthermore, the system may be configured to link the recorded driver characteristics, vehicle information, and traffic violation and further associate that information with at least one of a time, date, location, and combinations of each.

The system may further include a controller operatively coupled to the imaging devices, the memory, and the data processing logic. The controller may be operative to receive inputs and issue outputs. For example, the controller may be operative to activate the imaging devices in response to a user input. In another example, the controller may be operative to transmit a traffic violation over a wireless link using a transceiver.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

Embodiments are illustrated by way of example and not limitation in the figures in the accompanying drawings, in which like references indicate similar elements and in which.

DETAILED DESCRIPTION OF THE INVENTION

The invention relates generally to mobile surveillance and, more particularly, to a surveillance system and methods by which an imaging device of a mobile unit is configured to monitor, detect, and record traffic violations. Advantageously, through use of the mobile unit, the system can analyze, detect, and communicate traffic violations effectively and efficiently.

Figure 1A:
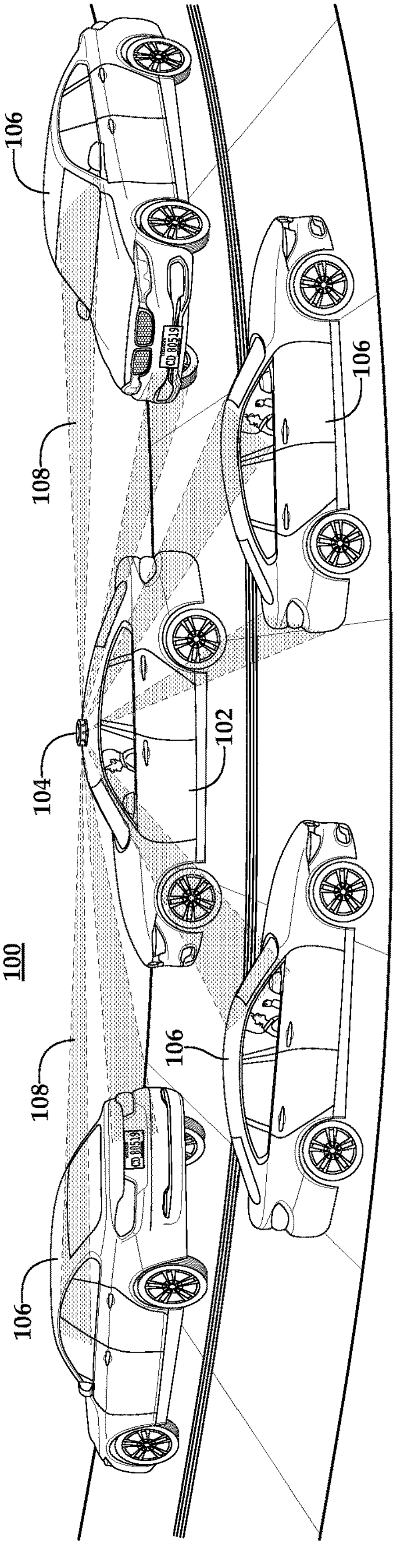
FIG. 1A illustrates an exemplary mobile surveillance system that may aid in policing traffic violations.
Figure 1B:
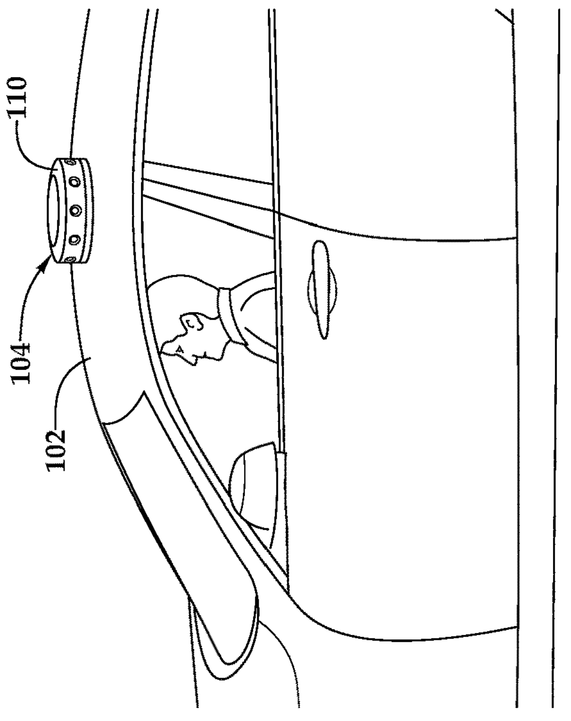
FIG. 1B illustrates the exemplary mobile surveillance system of FIG. 1A including a mobile unit and an imaging device.

Turning now to the drawings wherein like numerals represent like components, FIGS. 1A-1B illustrate an exemplary mobile surveillance system 100 that may aid in policing traffic violations, such as illegal cell phone use while driving. Private citizens and law enforcement may use system 100 for surveillance, security, traffic control applications, combinations of each, and the like.

Surveillance system 100 of FIGS. 1A-1B includes a mobile unit 102 and an imaging device 104, which may include one or more cameras and/or license plate readers (LPRs). Imaging device 104 may, automatically or in response to a user action, monitor and record information relating to a traffic violation. Imaging device 104 may be configured to continuously monitor and record information. In another example, imaging device 104 may be configured to wake from a low power state to begin capturing and recording information when detecting another vehicle 106. In yet another example, imaging device 104 may be configured to activate in response to a user action, such as pressing a button that sends a command to the imaging device 104.

As shown in FIG. 1A, imaging device 104 may be configured to monitor license plate information and driver characteristics of other vehicles 106. Other vehicle 106 may be moving in the same direction and/or in the opposite direction of mobile unit 102. While illustrated as a car, it is contemplated that mobile unit 102 may be any suitable motor vehicle, such as a motorcycle, truck, and bus. It should be understood that the principles of the present disclosure may be applicable to a variety of vehicle assemblies and components.

Imaging device 104 may be handheld or attached to mobile unit 102 for recording and detecting traffic violations, as described in more detail below. As shown, imaging device 104 may monitor and record information in all directions (i.e., 360 degrees) around the mobile unit 102. In addition, vertical viewing angles 108 of imaging device 104 may facilitate capturing both license plate information and drivers of other vehicles.

As illustrated in FIG. 1A, vertical viewing angles 108 of imaging device 104 may range from about thirty degrees to about one hundred and twenty degrees, and preferably be about sixty degrees. It is further contemplated that imaging device 104 may be motorized to scan up, down, and sideways, or to point in a particular direction, and those functions can be automated and/or manual.

As shown in FIG. 1B, a housing 110 may protect imaging device 104 from environmental conditions, such as moisture, dirt, ultra violet radiation, as well as impact conditions. Housing 110 may be dome shaped and attach to the outside or inside of the mobile unit 102 via any suitable means, such as via a bracket or railing mechanism. Also, housing 110 and/or imaging device 104 may be mounted at a height above the roof of the mobile unit 102. For example, the height may range from between about one inch and ten inches above the roof, and preferably between about two inches and six inches above the roof. Moreover, housing 110 and/or imaging device 104 may be at a height above the ground ranging from between about six inches and ten feet, and preferably between about twelve inches and six feet.

While illustrated as mounted on the roof of mobile unit 102, it is contemplated that housing 110 may be mounted on the hood, bumper, doors, or any other section of mobile unit 102. Moreover, housing 110 and/or imaging device 104 may be removably attached or permanently secured to the inside or outside of mobile unit 102. For example, housing 110 and/or imaging device 104 may be secured to a dashboard of mobile vehicle 102.

For power, imaging device 104 may be operatively connected to a power source of the mobile unit 102. Alternatively, the imaging devices 104 can connect to another power source and/or be powered via reusable energy technologies, such as solar power. Examples of suitable power sources may include batteries and/or a capacitor. The batteries may be rechargeable lithium-ion batteries including, for example, thin film lithium ion batteries, a lithium ion polymer battery, a nickel-cadmium battery, a nickel metal hydride battery, a lead-acid battery, and combinations of each.

Imaging devices 104 may include one or more cameras, license plate readers, and/or other imaging equipment, such as a recording camera, a photocell, or any other device capable of capturing and producing an image and/or video. As illustrated in the exemplary surveillance system 100 of FIGS. 1A-1B, imaging device 104 may include between about five and fifteen cameras, and preferably about ten cameras to facilitate capturing information all around mobile unit 102. One or more cameras of imaging device 104 may take an image and/or recording simultaneously. For example, each camera facing the right side of mobile unit 102 may, automatically or in response to a user input, take a picture at a moment in time. The multiple images and/or records may be compiled for a complete view of the surroundings or for a side by side analysis of the information at a point in time. In addition to imaging equipment, other input devices are contemplated, such as a microphone and a signal detector.

As shown in FIG. 1B, imaging device 104 may take images and record videos in a three hundred and sixty degree field relative to a longitudinal axis of imaging device 104. An angle between each camera's field of view may range from about ten degrees and about twenty degrees relative to the longitudinal axis of imaging device 104, and preferably an angle between each camera may be about fifteen degrees relative to the longitudinal axis of imaging device 104.

Figure 2A:
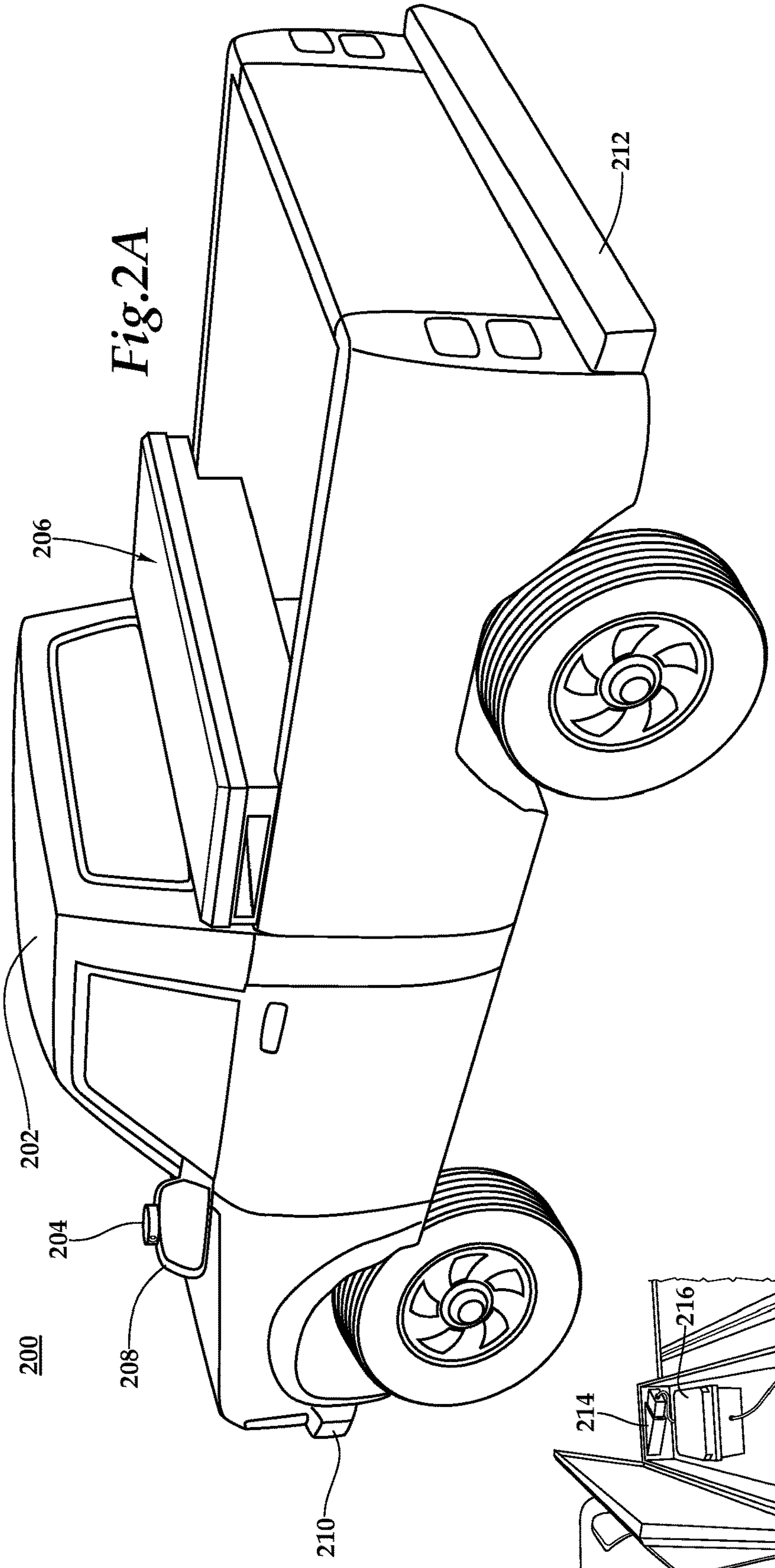
FIG. 2A illustrates another exemplary mobile surveillance system that may aid in policing traffic violations.
Figure 2B:
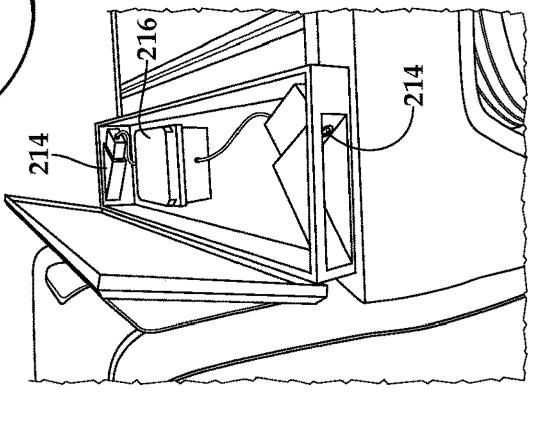
FIG. 2B illustrates the exemplary mobile surveillance system of FIG. 2A including a license plate reader.

FIGS. 2A-2B illustrate another exemplary surveillance system 200 that may aid in policing traffic violations, such as illegal cell phone use while driving. Surveillance system 200 includes a mobile unit 202, one or more video or still cameras 204, and a license plate reader (LPR) system 206.

Cameras 204 may be configured to take videos or still images of distracted drivers. Examples of cameras 204 may include video cameras, still cameras, charge-coupled device cameras, infrared cameras, and the like. As shown in FIG. 2A, cameras 204 may be positioned on side mirrors 208 of mobile unit 202, however, other locations are contemplated. For example, cameras 204 may be mounted on a front bumper 210 and/or a back bumper 212 of mobile unit 202. Moreover, cameras 204 may be mounted on mobile unit in other suitable locations (e.g., front, rear, side or top of vehicle) to allow up to 360° coverage relative to mobile unit 202.

Each camera 204 of surveillance system 200 may include a lens and various optical elements. The camera lens may provide a desired focal length and field of view. Cameras 204 may be associated with, for example, a 6 mm lens or a 12 mm lens. Also, cameras 204 may be configured to take images and/or videos in a desired field-of-view (FOV). For example, cameras 204 may be configured to have a regular FOV, such as within a range of about thirty degrees to about eighty degrees, and preferable a range of about forty degrees to about sixty degrees. In addition, cameras 204 may be configured to have include a wide angle camera with up to a one hundred and eighty degree FOV.

As shown in FIG. 2B, LPR system 206 may include one or more LPR cameras 214 operatively coupled to an LPR processing unit 216. In one embodiment, LPR system 214 may be a Leonardo ELSAG Mobile Plate Hunter™ automatic license plate reader.

LPR processing unit 52 may be responsible for processing images captured by LPR cameras 214, extracting license plate information, and/or transmitting data over a computer network. While illustrated as a separate component, LPR processing unit 216 may be physically incorporated into one or more of LPR cameras 214, other imaging equipment of mobile unit 202 or integrated in a remote server.

Either locally or through communications with various servers—such as a DMV database server—surveillance system 200 may be configured to compare the license plate information to the various databases and identify information corresponding to the vehicle. Surveillance system 200 further may be configured to associate information and data captured by one or more components with various spatial and temporal information. For example, one or more components of surveillance system 200 may constantly monitor time and location data using, for example, GPS or other sensor data available to the system 200.

Figure 3A:
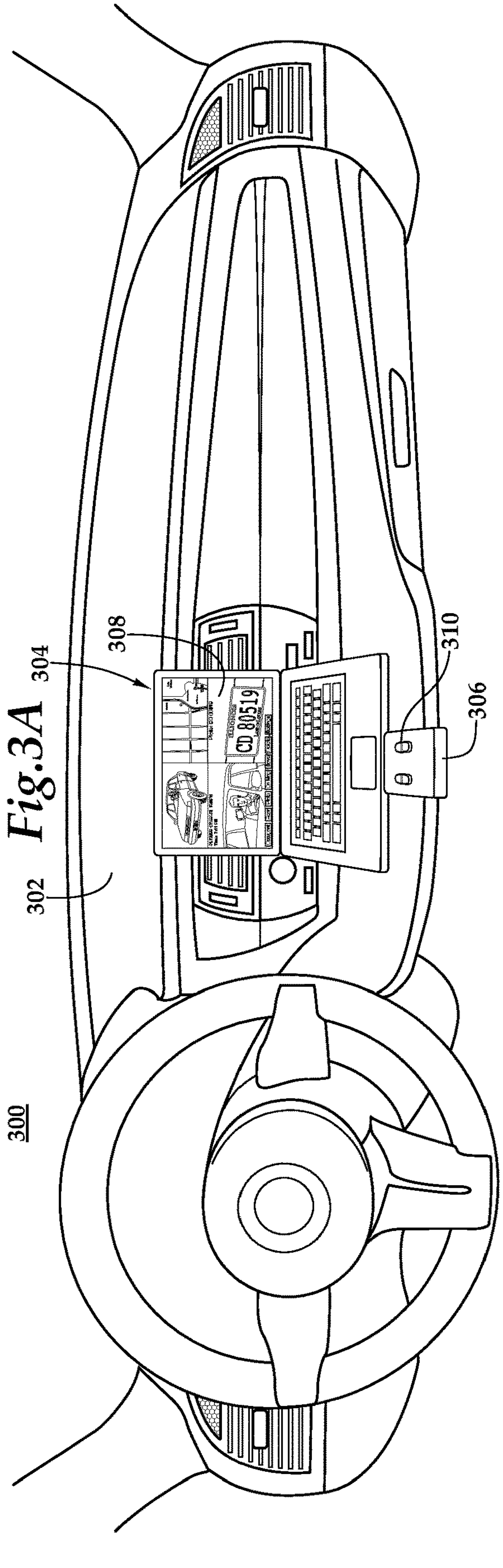
FIG. 3A illustrates a dashboard of a mobile unit of an exemplary surveillance system including a computing device.

FIG. 3A illustrates a dashboard 302 of a mobile unit, such as mobile units 102, 202, of an exemplary surveillance system 300. As shown, dashboard 302 may include a computing device 304 and an input controller 306.

As shown, input controller 306 may include one or more physical buttons 310. Each physical button 310 may associate with one or more operations of surveillance system 300. While illustrated as buttons, it is contemplated input controller 310 may include dials, slider switches, joysticks, click wheels, and the like.

By engaging one or more buttons 310, electrical signals may be sent to other input devices (e.g., imaging devices, cameras, and/or LPRs) of the surveillance system 300. In addition to activating (or waking from a lower power state) other input devices, electronic signals may include instructions corresponding to the engaged physical button. For example, engaging one button of input controller 306 may cause one or more cameras of surveillance system 300 to begin recording for a specific duration of time. The duration of time may range between about five seconds to about sixty seconds, and preferably between about ten seconds and about forty seconds. In certain embodiments, the duration of time may range between about twenty seconds and thirty seconds.

While illustrated as separate components, it is contemplated that input controller 306 may be incorporated into computing device 304.

Computing device 304 may be configured to request and receive information from one or more components of the surveillance system 300. Examples of a suitable computing device may include personal computers, smartphones, tablets, and the like. Also, it is contemplated that computing device 304 may be incorporated into the mobile unit of surveillance system 300.

As shown in FIG. 3A, computing device 304 may include a display 308 that is configured to output various types of contents, such as images, videos, text, a graphic user interface (GUI) including various types of contents, an application execution screen, and the like. For example, the display 308 may display a user interface screen including, for example, a keypad, a touch pad, a list menu, and an input window.

Display 308 may include any suitable mechanism for outputting the various content. For example, display 308 can include a thin-film transistor liquid crystal display (LCD), an organic liquid crystal display (OLCD), a plasma display, a surface-conduction electron-emitter display (SED), organic light-emitting diode display (OLED), or any other suitable type of display. In some embodiments, display 308 can include a backlight for illuminating the display. For example, display 308 can include one or more incandescent light bulbs, light-emitting diodes (LEDs), electroluminescent panels (ELPs), cold cathode fluorescent lamps (CCFL), hot cathode fluorescent lamps (HCFL), any other suitable light source, or any combination thereof. Display 308 can display visual content in black-and-white, color, or a combination of the two. Display 308 can display visual content at any suitable brightness level or resolution.

Computing device 304 further may include a processing component for analyzing data output from the one or more components of the surveillance system 300, such as the imaging device of FIGS. 1A-1B and/or the cameras and LPRs of FIGS. 2A-2B. The data processed and produced through processing component may be stored to, for example, match with an entry from an archive accessible to the system 300 corresponding to an owner of a vehicle. For images and video taken by the surveillance system 300, the processing component of computing device 304 may be configured to apply an object character recognition (OCR) identification algorithm to an image or video. An exemplary OCR identification algorithm isolates one or more characters from a vehicle license plate number, segments multiple characters into a single character image, and compares the single character image against a set of standard character images to determine each character.

The processing component of computing device 304 also may facilitate object extraction and detection. Object detection is accomplished using motion, texture, and contrast in the data. Furthermore, the processing component may be configured to characterize certain objects, such as color, dimension, and shape. Using the objects and the associated characteristics thereof, rules may be applied which implement a specific surveillance function. As an example, traffic violation analysis may be performed, allowing a fast evaluation on complete lists of objects, or a simple detection of actual objects, such as phones, laptops, tablets, and seatbelts.

The computing device 304 may further include a violation detection component configured to detect and determine a traffic violation. Violation detection component may be configured to access a rules database of computing device 304 including a set of rules for applying to data output from the processing component. For purposes of this application, a set of rules may encompass protocols and procedures for detecting a violation. For example, a rule may include the detection of objects for a specific traffic violation.

Through use of computing device 304, surveillance system 300 may determine a traffic violation. Specifically, the system may detect a traffic violation by determining that the driver is using a cell phone while operating a vehicle. The system 300 also may determine that the driver is operating the vehicle outside of proper safety regulations, such as by failing to wear a seatbelt. Other violations that the system may detect include underage driving, ingesting illegal substances while driving, noise violations, and text communications through, for example, data signal detection.

Figure 3B:
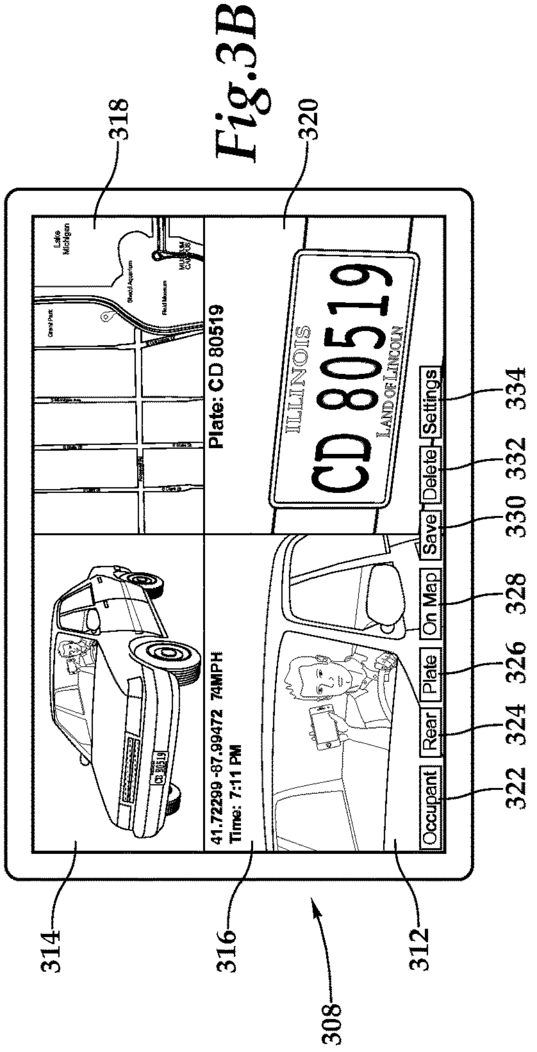
FIG. 3B illustrates an exemplary user interface of the computing device of FIG. 3A.

FIG. 3B illustrates an exemplary user interface 312 corresponding to display 308 of FIG. 3A. As shown, user interface 312 may include a number of sections and display information corresponding to one or more components of surveillance system 300.

As shown in the exemplary user interface 312 of FIG. 3B, a first section 314 may be configured to display an image or live feed of a vehicle operator using a cell phone monitored by a camera of the surveillance system 300. System 300 may be configured to, automatically or in response to a user input, display information in first section 314.

A second section 316 may be configured to zoom in on the image or recording of the first section 314. As shown, second section 316 further may display additional information, such as location information (e.g., coordinates), a speed with which the mobile unit is moving, and a time.

A third section 318 of the exemplary user interface may be configured to display a continuously updated geographic location of surveillance system 300. It is also contemplated that the third section 318 may display other location-related information, such as a virtual area corresponding to information that components of the system 300 may obtain.

A fourth section 320 may be configured to display an image of a license plate corresponding to the vehicle shown in first section 314 and second section 316. As shown, fourth section 320 may further display text corresponding to the characters extracted from the license plate by one or more components of surveillance system 300.

Surveillance system 300 may be configured to store, either persistently or temporarily, the data generated by computing device 304. For example, surveillance system 300 may be configured to store image and/or video data and associate that data with location/speed data. Surveillance device 300 may be configured to, automatically or in response to a user input, store the information in a local and/or remote memory or delete the information if, for example, no violation was detected. It is contemplated that the memory may be secure and/or tamperproof to, for example, facilitate use of the information for evidentiary purposes.

As shown in FIG. 3B, user interface 312 further may include a number of view options corresponding to one or more sections of the user interface. View options may include an occupant view 322, a rear view 324, a plate view 326, and map view 328. Also, user interface 312 may include a number of control options including a save option 330, a delete option 332, and a settings option 334. Setting options 334 may include, but are not limited to, configurations and rules for various components of surveillance system 300. For example, a user, through use of setting options 334, may define thresholds and adjust values for one or more cameras of the system 300.

Figure 4:
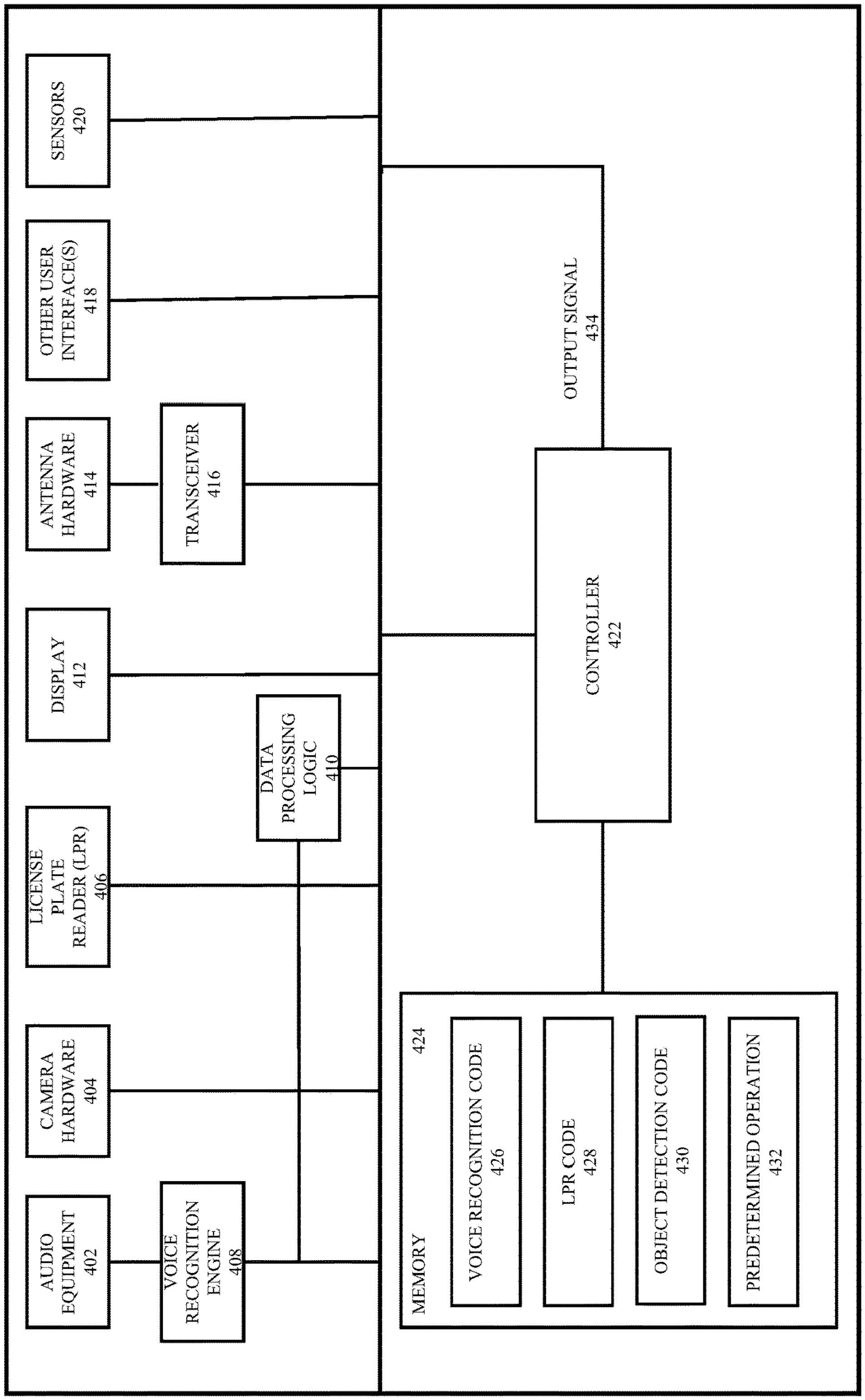
FIG. 4 is a block diagram illustrating a system that may implement one or more techniques of the invention.

FIG. 4 illustrates an exemplary block diagram of a surveillance system 400. As shown, surveillance system 400 may include audio equipment 402, camera hardware 404, and license plate readers 406. While audio equipment 402, camera hardware 404, and license plate readers 406 are shown as separate interoperating components, it is contemplated that the functions of each component are subsystem components of a single integrated system.

Audio equipment 402 may be operatively coupled to a voice recognition engine 408 and data processing logic 410. Audio equipment 402 may include, among other things, at least one microphone, at least one speaker, signal amplification, analog-to-digital conversion/digital audio sampling, echo cancellation, and/or other audio processing, which may be applied to one or more microphones and/or one or more speakers of the surveillance system 400.

The camera hardware 404 may include at least one camera and is operatively coupled to the data processing logic 410. Camera hardware 404 can include any suitable device for capturing images and may include multiple cameras at different locations of a mobile unit, as detailed above. Camera hardware 404 may include, among other things, at least one camera, any appropriate image sensor, such as, but not limited to, a charge-coupled device (CCD), CMOS chip, active-pixel sensor (APS), Bayer sensor, etc.

License plate readers 406 also are operatively coupled to the data processing logic 410. It is contemplated that license plate readers 406 may be physically incorporated into one or more of cameras of camera hardware 404 or integrated in a remote system.

License plate readers 406 may be responsible for capturing and processing images and extracting license plate information. License plate readers 406 may include one or more cameras for automatically imaging a license plate and extracting a character string from the image for vehicles that come into a field of view of the camera. Also, license plate readers 406 may provide illumination, which can be in the form of a controlled light source adapted to brighten vehicle license plates during the day and/or allow camera operation during the night. Alternatively, the illumination can be an infra-red (IR) light source, i.e. invisible to the driver of the neighboring vehicles.

Additional components of surveillance system 400 may include a display 412, antenna hardware 414, including a transceiver 416, other user interfaces 418, such as, for example, a keyboard, touch sensors, mouse, buttons, and the like.

Surveillance system 400 may further include one or more sensors 420, such as a GPS system, compass, gyroscope and accelerometer (which may be separate or integrated in a single package). Various selectable buttons and/or selectable features of display 412 may be selected in various ways, such as, but not limited to, mouse cursor point-and-click, touch screen, scrolling a cursor to the selectable item and hitting an "enter" key, using hot keys corresponding to the selectable feature, voice commands, etc., or any other suitable way of selecting a selectable feature.

Data processing logic 410 may be configured to detect, extract, and/or process data from one or more components of the surveillance system. For example, data processing logic 410 may be configured to determine whether an audible input includes a voice command and initiate one or more processes corresponding to the voice command. In certain embodiments, data processing logic 410 may perform further language processing to understand what the voice command means and engage the necessary procedures/components required to undertake carrying out the directives of the voice command.

In another example, data processing logic 410 may be configured to extract the textual characters of a license plate into a text string. Based on the extracted characters, the surveillance system may query vehicle registries or other databases using the text string license plate and store the results of the query for further action by a user.

In yet another example, data processing logic 410 may be configured to detect an object—such as a phone, laptop, tablet, and seatbelt—captured by the surveillance system and associate that object with other data, such as a license plate. Also, data processing logic 410 may be configured to identify vehicles—such as make and model—based on, for example, pre-defined outlines or shapes of vehicles.

Controller 422 is operatively coupled to the components mentioned above and to a non-volatile, non-transitory memory 424. The controller 422 may be configured to receive inputs and issue output signals. The output signals produced by controller 422 may be to a component of the surveillance system 400 or may be to an external system that is physically external from the surveillance system 400.

Memory 424 may include voice recognition code 426, LPR code 428, object recognition code 430, and predetermined operations 432. The various executable codes in memory 424 correspond to the voice recognition engine 402, the camera hardware 404, and the license plate reader 406. Among other things, when executed, these codes may provide instructions that cause one or more components of surveillance system 400 to record a video, capture images, process data, and store the corresponding data along with, for example, a location identifier and timestamp in memory.

Controller 422 further may be configured to match the data extracted by data processing logic 410 to a predetermined operation 432 stored in memory 424. Based on the data, controller 422 may be configured to obtain the associated predetermined operation from memory 424 and issue an output signal 434 to the corresponding components of the surveillance system 400. For example, if an audio recording matches an audio template stored in memory, controller may provide an output signal based on the predetermined operation associated with the audio template.

Controller 422 may also use the inputs from one or more components of the system 400 to label segments of data. Labeled segments of data may be as short as individual video frames (typically 0.033-0.040 second) or may range between five seconds and thirty seconds. Each segment may be labeled with the time and date that the segment was acquired and the exact position and orientation at the time the segment was captured. The additional data (time, date, position, orientation) may be stored along with image data, or may be stored in a separate portion of memory. If stored separately, the additional data may include a link to the location of the associated segment of camera and audio data.

Controller 422 may further use antenna hardware 414 of surveillance system 400 to output a signal 434 containing data to a second device. Antenna hardware 414 includes any known or developed structure for receiving electromagnetic energy in the radio frequency (RF) spectrum. For example, transceiver 414 may encode or decode data using amplitude modulation, frequency modulation, phase modulation or any combination thereof.

The surveillance process may be initiated using a variety of approaches. In one approach, a user input, such as engaging a user interface (e.g., pressing a button), may initiate the process and/or wake one or more components from a powered down state (i.e. sleep mode).

In another approach, a component of surveillance system 400 may automatically send out a signal periodically to determine whether a vehicle is near, such as between about ten feet and thirty feet from mobile unit. Also, a sensor, such as a proximity sensor, may be used as a trigger one or more components of surveillance system 400 to initiate the capturing, processing, and extraction of data.

Because the components of system 400 may be powered by a local power source (e.g., a mobile unit's battery), this approach may be periodic in order to conserve battery power. Where power may be provided from a separate power source, power conservation is less of an issue and therefore the components of surveillance system 400 may be constantly scanning and processing data to, for example, detect vehicles and/or traffic violations.

Other approaches to initiate a process of system 400 are contemplated including, for example, gestures, gaze, and signals from remote devices. Such processes are further illustrated by way of example in flowcharts of the accompanying drawings and the corresponding description below.

Figure 5:
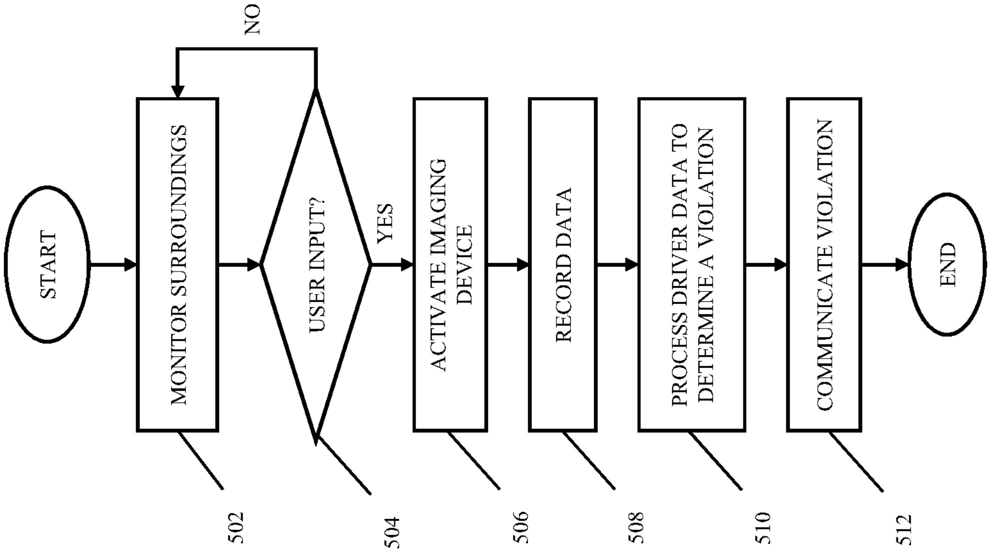
FIG. 5 is a flow chart illustrating an exemplary operation for detecting and communication a traffic violation.

FIG. 5 is a flowchart 500 illustrating the steps of an exemplary operation of a surveillance system for detecting and communicating a violation. The method of operation begins and, in step 502, a mobile unit including an input device (e.g., imaging device, cameras, and/or LPRs) may monitor the surrounding environment. Mobile unit may be moving, for example, via a residential road, commercial road, highway, freeway, and expressway.

In decision step 504, the system may detect a user input. Examples of a user input may include pushing a button or a detecting a voice command. If in decision step 504, the system does not detect an input, the system reverts back to step 502. If the system does detect a user input, in step 506, the system may activate one or more imaging devices of the mobile unit. It is also contemplated that the system may automatically activate one or more imaging devices in response to a trigger event, such as detecting another vehicle traveling in the same direction or in an opposite direction.

In step 506, the system may record vehicle information and/or driver characteristics corresponding to the operator in another vehicle. Vehicle information may refer to characteristics of a vehicle, such as make, model, color, and license plate number.

In step 508 of FIG. 5, the system may, automatically or in response to a user input, process the driver characteristics to determine a violation. For example, the system may process the driver characteristics to determine that a cell phone is being used while operating the vehicle. It is contemplated that the that system may determine a violation use by accessing phone records. In step 510, the system will communicate the violation and/or recommend a course of action, such as issuance of a citations for the violation.

Communication of the violation may be to a private citizen, law enforcement, third party agency, and/or the operator of the vehicle, which the system can determine by matching vehicle information to an entry of a database accessible to the system. For example, the system may physically mail or electronically communicate the citation to the operator of the vehicle. The system also may be configured to determine whether the operator of the vehicle has a warrant or other history and communicate that information to an appropriate user.

Figure 6:
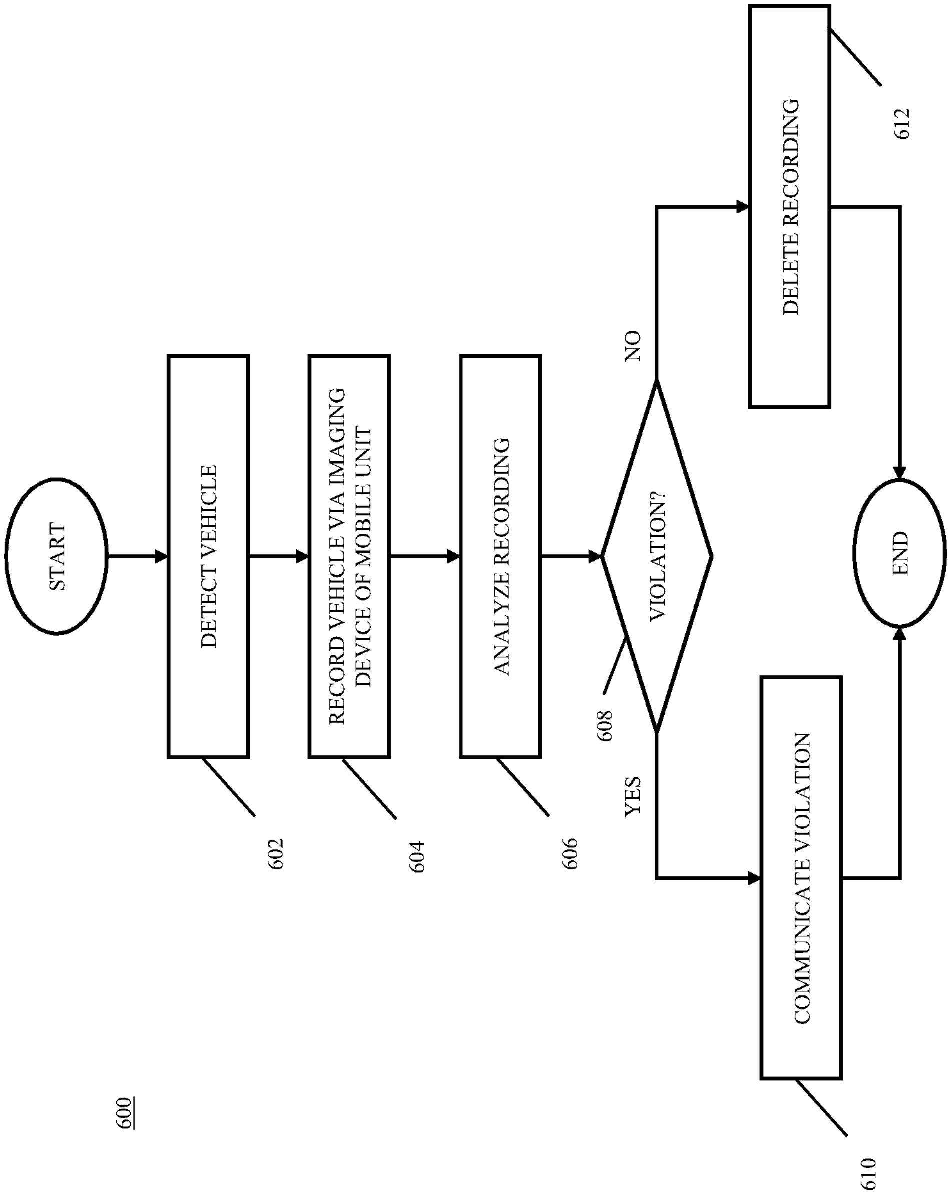
FIG. 6 is a flow chart illustrating another exemplary operation for detecting and communicating a traffic violation.

FIG. 6 is a flowchart 600 illustrating the steps of another exemplary operation of a surveillance system. The method of operation begins and, in step 602, the system may, automatically or in response to a user input, detect a vehicle. In response to detecting a vehicle, in step 604, the system may be configured to begin recording that vehicle via an input device, such as an imaging device, camera, or LPR. In step 606, the system may be configured to analyze the recorded data.

In decision step 608, the system will determine whether a violation is detected. The system may be configured to automatically detect a violation, for example, based on a set of rules accessible to the system. Alternatively, the system may determine that a violation has occurred based on an input from a user. The system may be configured to preserve the recorded data and generate an evidentiary record for use in policing traffic violations. If in step 608 a violation is detected, in step 610, the system will communicate the violation. If in step 307, the system does not, automatically or in response to a user input, detect a violation, in step 311, the system will delete the recorded data.

Figure 7:
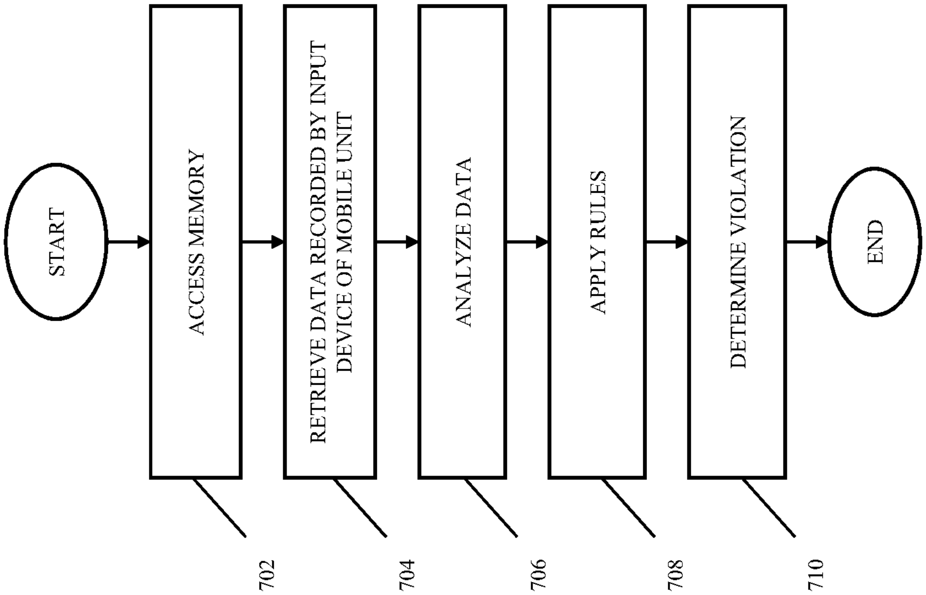
FIG. 7 is a flow chart illustrating yet an exemplary operation of the system for determining a traffic violation.

FIG. 7 is a flowchart 700 illustrating the steps of yet another exemplary operation of a surveillance system. The method of operation begins and, in step 702, the system may access a memory. In step 704, the system may retrieve data recorded by an input device, such as an imaging device, a camera, and/or an LPR. In step 706, the system will analyze the retrieved data using operational or programming instructions stored in the memory. For example, the system may facilitate detecting and extracting objects corresponding to the driver of a vehicle. In step 708, the system will apply a set of rules, which may be stored in the memory or accessible to the system. In step 710, the system may be configured to determine a violation based on the analyzed data.

Figure 8:
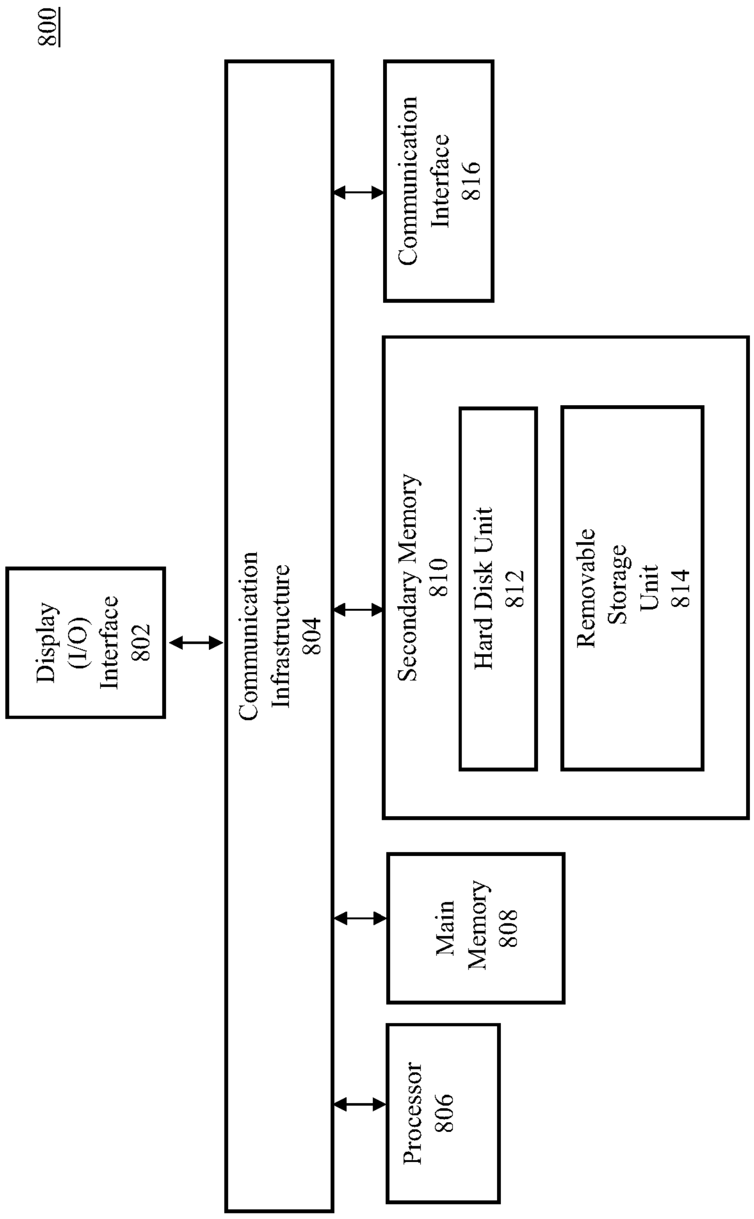
FIG. 8 is an exemplary computing system that may be used for implementation of all or a portion of the invention.

FIG. 8 illustrates an exemplary computer system 800 that may be used to implement the methods according to the present invention. One or more computer systems 800 may carry out the present invention according to processing instructions, or computer code.

Computer system 800 includes an input/output interface 802 connected to communication infrastructure 804—such as a bus—which forwards data such as graphics, text, and information, from the communication infrastructure 804 to other components of the computer system 800. The input/output interface 802 may be the imaging device of FIGS. 1A-1B, the cameras and LPRs of FIGS. 2A-2B or, alternatively any other peripheral device capable of capturing and/or recording a violation. Furthermore, interface 802 may be the input controller of FIG. 3A or a keyboard, joystick, trackball, and mouse for a user to enter what he or she believes to be a violation.

One or more processors components 806 may be a special purpose or a general—purpose digital signal processor that processes certain information. Computer system 800 may also include a main memory 808, for example random access memory ("RAM"), read—only memory ("ROM"), mass storage device, or any combination of tangible, non—transitory memory as well as a secondary memory 810 such as a hard disk unit 812, a removable storage unit 814, or any combination of tangible, non—transitory memory.

Computer system 800 may also include a communication interface 816, for example, a modem, a network interface (such as an Ethernet card or Ethernet cable), a communication port, a PCMCIA slot and card, wired or wireless systems (such as Wi-Fi®, Bluetooth®, Infrared), local area networks, wide area networks, intranets, etc. Communication interface 816 allows software, instructions and data to be transferred between the computer system 800 and external devices or external networks.

Computer programs, when executed, enable the computer system 800, particularly processor 806, to implement the methods of the invention according to computer software instructions. The computer system 800 of FIG. 8 is provided only for purposes of illustration, such that the invention is not limited to this specific embodiment. It is appreciated that a person skilled in the relevant art knows how to program and implement the invention using any computer system.

Computer system 800 may be a handheld device and include any small—sized computer device including, for example, a personal digital assistant ("PDA"), smart hand—held computing device, cellular telephone, or a laptop or netbook computer, hand held console or MP3 player, tablet, or similar hand held computer device, such as an iPad®, iPad Touch® or iPhone®.

Figure 9:
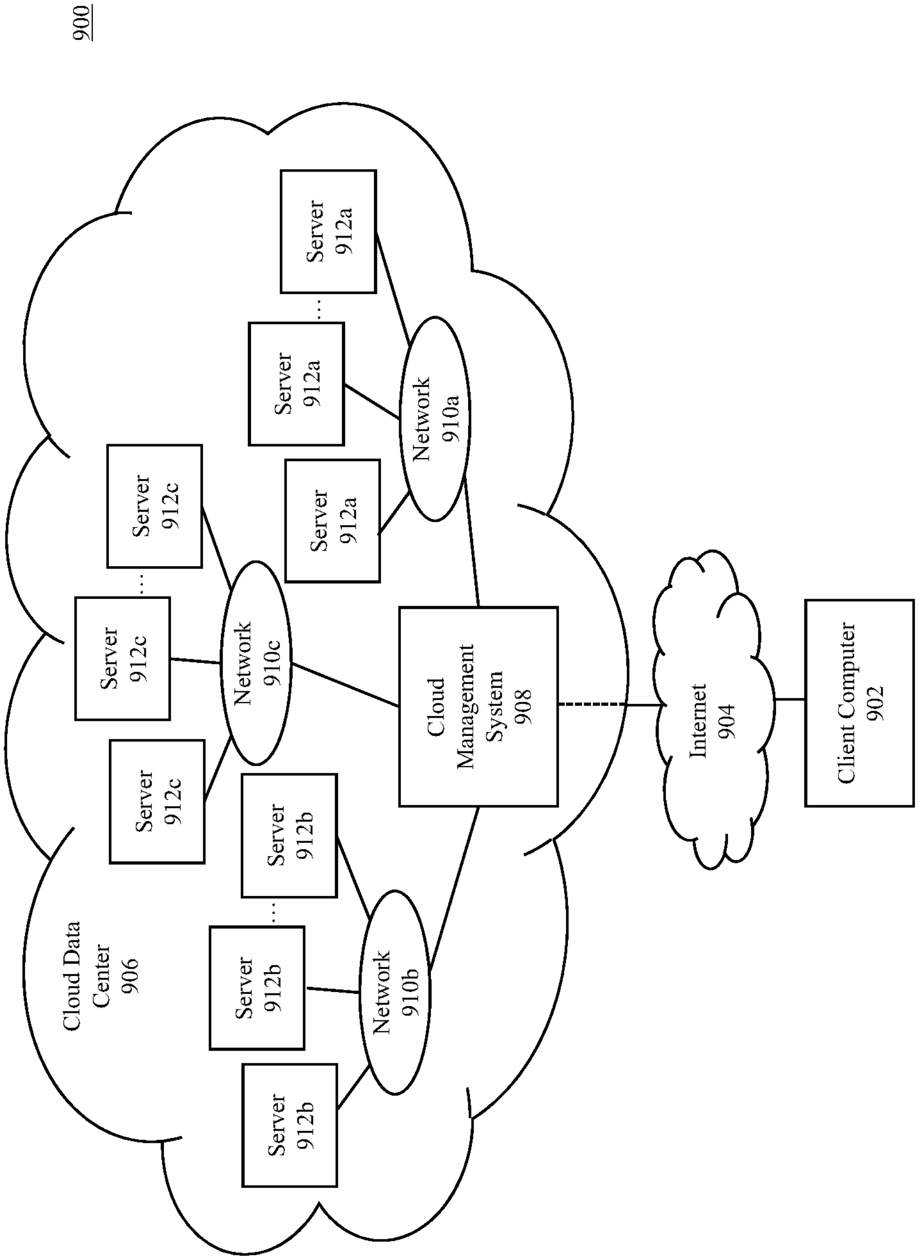
FIG. 9 is an exemplary cloud computing system that may be used for implementation of all or a portion of the invention.

Separate and apart from, or in addition to, computer system 800, the methods according to the invention may be implemented using a cloud computing system. FIG. 9 illustrates an exemplary cloud computing system 900 that may be used to implement the methods according to the invention. Cloud computing system 900 includes a plurality of interconnected computing environments. Cloud computing system 900 utilizes the resources from various networks as a collective virtual computer, where the services and applications can run independently from a particular computer or server configuration making hardware less important.

Specifically, cloud computing system 900 includes at least one client computer 902. Client computer 902 may be any device through the use of which a distributed computing environment may be accessed to perform the methods disclosed herein, for example, the computer described above in FIG. 8, a portable computer, mobile phone, personal digital assistant, tablet to name a few. Signals are transferred between Client computer 902 and external devices including networks such as Internet 904 and cloud data center 906. Communication may be implemented using wireless or wired capability such as cable, fiber optics, a phone line, a cellular phone link, radio waves or other communication channels.

Client computer 902 establishes communication with the Internet 904—specifically to one or more servers—to, in turn, establish communication with one or more cloud data centers 906. A cloud data center 906 includes one or more networks 910*a*, 910*b*, 910*c* managed through a cloud management system 908. Each network 910*a*, 910*b*, 910*c* includes resource servers 912*a*, 912*b*, 912*c*, respectively. Servers 912*a*, 912*b*, 912*c* permit access to a collection of computing resources and components that can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. A further group of resource servers can host and serve applications to load on an instantiation of a virtual computer, such as an email client, a browser application, a messaging application, or other applications or software.

Cloud management system 908 may be configured to query and identify the computing resources and components managed by the set of resource servers 912*a*, 912*b*, 912*c* needed and available for use in the cloud data center 906. Specifically, cloud management system 908 may be configured to identify the hardware resources and components such as type and amount of processing power, type and amount of memory, type and amount of storage, type and amount of network bandwidth and the like, of the set of resource servers 912*a*, 912*b*, 912*c* needed and available for use in cloud data center 906. Likewise, cloud management system 908 can be configured to identify the software resources and components, such as type of Operating System ("OS"), application programs, and the like, of the set of resource servers 912*a*, 912*b*, 912*c* needed and available for use in cloud data center 906.

Cloud computing system 900 of FIG. 9 is provided only for purposes of illustration and does not limit the invention to this specific embodiment. It is appreciated that a person skilled in the relevant art knows how to program and implement the invention using any computer system or network architecture.

In sum, the foregoing surveillance system facilitates monitoring, analyzing, detect, and recording driver characteristics and vehicle information and preserving this information in response to, for example, detecting a distracted driver. In this manner, an evidentiary record may be generated which may be utilized in the policing of traffic violations.

While the invention is susceptible to various modifications and alternative forms, specific exemplary embodiments of the invention have been shown by way of example in the drawings and have been described in detail. It should be understood, however, that there is no intent to limit the invention to the particular embodiments disclosed, but on the contrary, the intention is to cover all modifications, equivalents, and alternatives falling within the scope of the invention as defined by the appended claims.

The invention claimed is:

1. A surveillance apparatus for policing cell phone violations, comprising:

two or more imaging devices removably mounted on an exterior surface of a first vehicle, the two or more imaging devices configured to record driver characteristics and vehicle information corresponding to a second vehicle, wherein, in response to detecting the second vehicle, at least one or more of said imaging devices is motorized and configured to facilitate a 360 degree field of view in relation to said first vehicle for recording the driver characteristics and vehicle information;

data processing logic operatively coupled to a non-volatile, non-transitory memory and the one or more imaging devices, the data processing logic operative to:

access the recorded driver characteristics and the vehicle information;

process the vehicle information to extract characteristics of the second vehicle;

analyze the driver characteristics to detect one or more objects corresponding to an occupant of the second vehicle; and preserve, in response to the detection of the one or more objects, in said memory the recorded driver characteristics and vehicle information corresponding to the second vehicle for generating an evidentiary record for use in policing cell phone and seat belt violations, wherein the imaging devices are configured to be removably mounted to the exterior surface of the first vehicle for retrieval of said evidentiary record for use in policing cell phone and seat belt violations.

2. The surveillance apparatus of claim 1, wherein the two or more imaging devices is motorized to scan at least one of an up direction, down direction, and sideways direction, and further comprises at least one of a camera, license plate reader, and combinations of each.

3. The surveillance apparatus of claim 1, wherein the data processing logic is further operative to associate the recorded driver characteristics with at least one of a time, a date, a location, and combinations of each.

4. The surveillance apparatus of claim 1, wherein the two or more imaging devices is configured to continuously monitor surroundings.

5. The surveillance apparatus of claim 1, wherein the two or more imaging devices is configured to wake from a low power state in response to detecting the second vehicle.

6. The surveillance apparatus of claim 1, further comprising a controller operative to receive inputs and issue outputs, the controller operatively coupled to the two or more imaging devices, the memory, and the data processing logic.

7. The surveillance apparatus of claim 6, wherein the controller is configured to activate the two or more imaging devices in response to a user input.

8. The surveillance apparatus of claim 6, wherein the controller is further operative to transmit a traffic violation over a wireless link using a transceiver.

9. The surveillance apparatus of claim 1, wherein the data processing logic is further operative to access a database and identify an owner of the second vehicle by matching the extracted characteristics with a database, wherein the extracted characteristics include at least a license plate number.

10. The surveillance apparatus of claim 1, wherein said imaging devices are configured to be removably mounted to the exterior surface of the first vehicle for retrieval of said evidentiary record for use in policing violations including at least one of underage driving, ingesting illegal substances while driving, and noise violations.

11. The surveillance apparatus of claim 1, wherein the imaging devices of the first vehicle are configured to record driver characteristics of the second vehicle for a duration of time, the duration of time is between about twenty seconds and about thirty seconds.

12. A method of a surveillance apparatus for policing cell phone violations, the method comprising:

monitoring surroundings via two or more imaging devices removably mounted on an exterior surface of a first vehicle, wherein the imaging devices are configured to be removably mounted to the exterior surface of the first vehicle for retrieval of an evidentiary record for use in policing cell phone violations;

collecting, via the imaging devices, vehicle information and driver characteristics associated with a second vehicle moving in a same or an opposite direction of the first vehicle, wherein, in response to detecting the second vehicle, at least one or more of said imaging devices is motorized and configured to facilitate a 360 degree field of view in relation to said first vehicle for recording the driver characteristics and vehicle information;

processing the vehicle information to extract characteristics corresponding to the second vehicle;

analyzing the driver characteristics to detect one or more objects;

preserving, in response to the detection of the one or more objects, in said memory the recorded driver characteristics and vehicle information corresponding to the second vehicle for generating an evidentiary record for use in policing cell phone and seat belt violations, wherein the imaging devices are configured to be removably mounted to the exterior surface of the first vehicle for retrieval of said evidentiary record for use in policing cell phone and seat belt violations;

determining one or more violations based on the one or more detected objects; and communicating the violations and vehicle information to a user for display.

13. The method of claim 12, wherein said imaging devices are motorized such that each imaging device is automated to scan in a vertical direction and a horizontal direction.

14. The method of claim 12, wherein the collecting step further includes continuously recording driver characteristics and capturing vehicle information.

15. The method of claim 12, wherein the collecting step further includes waking said imaging devices from a low power state in response to detecting the second vehicle.

16. The method of claim 12, wherein the collecting step further includes activating said imaging devices in response to a user input.

17. The method of claim 12, wherein the processing step further includes extracting a character string corresponding to license plate information of the second vehicle.

18. The method of claim 12, further comprising accessing a database to identify an owner of the second vehicle by matching the character string to a database entry.

19. The method of claim 12, wherein the determining step further includes associating the cell phone violation with at least one of a time, a date, a location, and combinations of each.

20. The method of claim 12, wherein the communicating step further includes outputting a user interface including view options and control options.

* * * * *